(12) United States Patent
Spour (10) Patent No.: US 12,415,557 B2
(45) Date of Patent: Sep. 16, 2025

(54) PRAM

(71) Applicant: CYBEX GmbH, Bayreuth (DE)

(72) Inventor: Jiri Spour, Zlatniky-Hodkovice (CZ)

(73) Assignee: CYBEX GmbH, Bayreuth (DE)

( * ) Notice: Subject to any disclaimer, the term of this patent is extended or adjusted under 35 U.S.C. 154(b) by 773 days.

(21) Appl. No.: 17/597,652

(22) PCT Filed: Jul. 15, 2020

(86) PCT No.: PCT/EP2020/070056
§ 371 (c)(1),
(2) Date: Jan. 15, 2022

(87) PCT Pub. No.: WO2021/009262
PCT Pub. Date: Jan. 21, 2021

(65) Prior Publication Data
US 2022/0315089 A1  Oct. 6, 2022

(30) Foreign Application Priority Data
Jul. 16, 2019 (DE) .................... 20 2019 002 989.3

(51) Int. Cl.
*B62B 9/00* (2006.01)
*B62B 5/00* (2006.01)
*B62B 9/20* (2006.01)

(52) U.S. Cl.
CPC .......... *B62B 5/0073* (2013.01); *B62B 5/0033* (2013.01); *B62B 9/00* (2013.01); *B62B 9/20* (2013.01)

(58) Field of Classification Search
CPC ..... B62B 7/008; B62B 5/0073; B62B 5/0033; B62B 9/00; B62B 9/20
(Continued)

(56) References Cited

U.S. PATENT DOCUMENTS

| 5,746,282 A | 5/1998 | Fujiwara et al. |
| 2015/0066277 A1* | 3/2015 | Kojina ............ A61H 3/04 180/19.1 |

(Continued)

FOREIGN PATENT DOCUMENTS

| CN | 105644606 A | 6/2016 |
| CN | 106314511 A | 1/2017 |

(Continued)

OTHER PUBLICATIONS

Translation of EP 2332806 A accessed on Sep. 7, 2024 at www.espacenet.com (Year: 2010).*

(Continued)

*Primary Examiner* — James A Shriver, II
*Assistant Examiner* — Hilary L Johns
(74) *Attorney, Agent, or Firm* — Schwegman Lundberg & Woessner, P.A.

(57) ABSTRACT

Pram or pram frame, comprising at least one motor, in particular an electric motor, for the assisted driving of the pram or pram frame, a push bar for pushing the pram or pram frame, at least one force sensor device for detecting a direction and/or an amount of a force and/or a force component which acts on the push bar, and/or for detecting a variable derived from this force or force component, in particular a torque and/or a change of the force or force component over time, at least one velocity sensor device for determining a velocity of the pram or pram frame, and at least one control unit, which is configured in such a way that the motor assistance is adapted in dependence on a comparison of the measured force and/or force component and/or the variable derived therefrom to a force threshold value, wherein the force threshold value is established in dependence on a comparison of the measured velocity to a velocity threshold value.

9 Claims, 5 Drawing Sheets

(58) Field of Classification Search
USPC .................................................. 280/47.38
See application file for complete search history.

(56) References Cited

U.S. PATENT DOCUMENTS

| | | | |
|---|---|---|---|
| 2015/0066328 A1* | 3/2015 | Nakada | B62B 9/02 |
| | | | 701/93 |
| 2016/0129301 A1 | 5/2016 | Giannelli et al. | |
| 2017/0001656 A1 | 1/2017 | Katayama et al. | |
| 2018/0281838 A1 | 10/2018 | Andersson | |
| 2020/0180439 A1 | 6/2020 | Chung et al. | |

FOREIGN PATENT DOCUMENTS

| | | | |
|---|---|---|---|
| DE | 102011114337 A1 | 3/2013 | |
| DE | 102013224885 A1 | 6/2015 | |
| DE | 202017104166 U1 | 10/2018 | |
| EP | 2332806 A2 * | 6/2011 | ........... B62B 5/0073 |
| EP | 2848239 A1 | 3/2015 | |
| EP | 3444141 A1 | 2/2019 | |
| WO | WO-2012063476 A1 | 5/2012 | |
| WO | WO-2013167600 A2 | 11/2013 | |
| WO | WO-2016035727 A1 | 3/2016 | |
| WO | WO-2017176202 A1 | 10/2017 | |
| WO | WO-2021009262 A1 | 1/2021 | |

OTHER PUBLICATIONS

"Chinese Application 202080061668.0, Notification of the First Office Action dated Sep. 14, 2023", (Sep. 14, 2023), 20 pgs.

"International Application No. PCT/EP2020/070056, International Search Report and Written Opinion mailed Oct. 16, 2020", (Oct. 16, 2020), 13 pgs.

"International Application No. PCT/EP2020/070056, International Preliminary Report on Patentability mailed Jan. 27, 2022", (w/ English Translation), 8 pgs.

"Japanese Patent Application No. 2022-502467 Final Office Action mailed Nov. 19, 2024", with English translation, 6 pages.

* cited by examiner

PRAM

PRIORITY CLAIM TO RELATED APPLICATIONS

This application is a U.S. national stage filing under 35 U.S.C. § 371 from International Application No. PCT/EP2020/070056, filed on 15 Jul. 2020, and published as WO2021/009262 on 21 Jan. 2021, which claims the benefit under 35 U.S.C. 119 to German Application No. 20 2019 002 989.3, filed on 16 Jul. 2019, the benefit of priority of each of which is claimed herein, and which applications and publication are hereby incorporated herein by reference in their entirety.

The invention relates to a pram frame and a corresponding pram, in particular with motor assistance.

Motorized prams are known in principle. These can be configured so that they can be moved exclusively by motor force. Furthermore, equipping prams with motor assistance is known in principle, which assists the drive force of the person operating the pram, but does not provide assistance if no force is exerted by the operator.

It is the object of the invention to propose a pram frame which is simple to operate, not complex, and robust, in particular motorized and a corresponding pram which in particular permits the person operating the pram to control the pram in a simple, comfortable, and precise manner.

This object is achieved in particular by a pram or a pram frame or a corresponding method, according to one of the appended claims (each as such or in combination).

In particular, the object is achieved by a pram or pram frame, comprising at least one motor, in particular an electric motor, for the assisted driving of the pram or pram frame, a push bar for pushing the pram or pram frame, and at least one force sensor device for detecting a direction and/or an amount of a force and/or a force component which acts on the push bar, and/or for detecting a variable derived from this force or force component, in particular a torque and/or a change of the force or force component over time.

The force sensor device can comprise at least one torque sensor and/or at least two (force) sensors.

The invention generally relates to a pram or a pram frame which can have at least one push bar, multiple wheels (preferably three or four wheels), at least one sensor, and a drive. The drive can in turn respectively comprise at least one electric motor, a controller, and a (preferably secondary) battery.

The pram frame or the pram can comprise further elements, e.g., front wheel struts and/or rear wheel struts and possibly a child receiving device (for example seating unit or cradle) or adapters for attaching such a device.

The at least one sensor can be designed to detect a force applied by a user (thus a person who pushes the pram frame) for the purpose of pushing or components of this force and/or variables derived from the force or its components (for example a torque, a change over time, etc.).

The at least one sensor or a further sensor can be designed to detect a current velocity of the pram frame (in particular in relation to an underlying surface which the wheels contact during a use of the pram frame).

The at least one sensor can be arranged here (in particular if it is designed for detecting a force) in or on the push bar, in particular in or on a transverse section or horizontal section of the push bar. In particular, multiple such sensors, for example two such sensors, can also respectively be arranged in or on regions of the push bar (or of the transverse section or horizontal section) located relatively far outward, thus close to the lateral sides of the pram frame.

The at least one sensor can be arranged (in particular if it is designed to detect a force) so that its detection direction at least essentially points from the push bar away from the user, thus possibly in the direction of a child receiving device or in the direction of the adapters for receiving such a device. The sensor can preferably be inclined slightly downward starting from the above-mentioned direction, for example by 5° to 15°, in particular by 7° to 10°.

The at least one sensor can be arranged (in particular if it is designed to detect a torque) on or in a linkage point, possibly on or in the linkage points of the push bar on the other frame components.

The at least one sensor (in particular if it is designed to detect a velocity) can be arranged on or in the wheels or in their immediate surroundings. In particular, such a sensor can be arranged so that it can detect the rotational velocity of the wheels in relation to the further frame components. According to the embodiment, such a sensor can detect the complete revolutions of at least one wheel, for example in that a magnet is guided through a conductor loop by the rotation of the at least one wheel.

The at least one sensor (in particular if it is designed to detect a velocity) can be arranged on or in the motor, in particular to detect the motor speed.

The at least one sensor can be designed to record measured values at a frequency of at least 5 Hz, preferably at least 10 Hz. It can furthermore be designed to record measured values at a frequency of at most 200 Hz or at most 100 Hz.

The above object is furthermore preferably achieved by a pram or pram frame, comprising at least one motor, in particular an electric motor, for the assisted driving of the pram or pram frame, a push bar for pushing the pram or pram frame, at least one force sensor device (comprising at least one sensor, in particular as specified or embodied above) for detecting a direction and/or an amount of a force and/or a force component which acts on the push bar, and/or for detecting a variable derived from this force or force component, in particular a torque and/or a change of the force or force component over time, at least one velocity sensor device (comprising at least one sensor, in particular as specified or embodied above) for determining a velocity of the pram or pram frame, and at least one control unit, which is configured in such a way that the motor assistance is adjusted in dependence on a comparison of the measured force and/or force component and/or the variable derived therefrom to a force threshold value, wherein the force threshold value is established in dependence on a comparison of the measured velocity to a velocity threshold value.

One concept of the invention is based on a force currently acting on the push bar and a current velocity at which the pram frame moves being determined. For all measurements, preferably the positive direction always shall be the current movement direction of the pram frame—all (measured) velocities therefore have to be positive by definition. The force currently acting on the push bar is preferably compared to a force threshold value, wherein a velocity threshold value is additionally established.

The force threshold value is furthermore preferably set to a first positive value if the current velocity is less than (alternatively: less than/equal to) the velocity threshold value. If the current velocity of the pram is greater than/equal to (alternatively: greater than) the velocity threshold value, the force threshold value is preferably set to a second positive value. The first positive value is preferably not equal to the second positive value, preferably greater than it (but can also be less).

According to the invention, it has been recognized in particular that a previously fixedly established force threshold value can be disadvantageous. A rigid response behavior of the electrical drive is possibly defined with the establishment of the force threshold value, which is only dependent on the force acting on the push bar. Among other things, this can have the result that the assistance of the electrical drive is also triggered in situations in which assistance is not helpful or desired. In addition, it can be that the drive is operated under unfavorable boundary conditions (for example high load at low speed).

According to the invention, it is ensured in an improved manner that the assistance by the electrical drive if possible only takes place in situations in which the assistance is desired.

The velocity threshold value can be less than 4 km/h. It is preferably at least 1 km/h and/or at most 3 km/h, for example (approximately) 2 km/h.

The first value for the force threshold value is preferably higher than the second value of the force threshold value. The first value is particularly preferably to be 150% to 250%, for example (approximately) 200%, of the second value.

The first value can be, for example, greater than or equal to 20 N, or greater than or equal to 25 N, or greater than or equal to 30 N.

The second value can be between 8 N and 25 N, preferably between 10 N and 20 N. It can be, for example, 15 N or 17 N.

As soon as the currently detected force exceeds a respective force threshold value (which is in particular relevant as a function of the current velocity), assistance of the user by the drive can be permitted (or the control unit can be configured accordingly).

As long as the currently detected force does not exceed a force threshold value (which is in particular relevant as a function of the current velocity), assistance of the user by the drive is not permitted (or the control unit is preferably configured accordingly). In this case, permitting the assistance does not necessarily mean that it also actually takes place (but this is possible). This can possibly be dependent on still further parameters (or, alternatively, not).

Assistance of the user by the drive preferably only takes place when it is (at least) ensured that one wheel rotates or multiple wheels rotate (or the control unit is configured accordingly).

Assistance of the user by the drive preferably only takes place when, based on a suitable evaluation of the measured values, in particular the measured values with respect to a force applied for pushing (or of its components and/or variables derived therefrom), it can be presumed that a human user pushes the pram. The control unit can be configured accordingly for this purpose.

According to the embodiment, the electrical drive is activated for the assistance in such a way that the average force to be applied, which is required to push or pull the pram, is constantly regulated (at least for a certain time interval) to a previously established force value. The force value is preferably the first or the second force threshold value, particularly preferably the second force threshold value. The control unit can be configured accordingly for this purpose.

The configuration of the control unit according to the invention or the method according to the invention has proven to be particularly advantageous since in particular in the case of a first force threshold value raised in relation to the second force threshold value, frequent, undesired switching on and off of the assistance by the electrical drive is prevented from taking place, in particular if the pram is rocked back and forth (almost in place), for example to calm a child in the pram.

Furthermore, the efficiency of the electrical drive can be lower at lower velocities. Frequent switching on of the assistance in a low velocity range can therefore have the result that the (possibly secondary) battery which supplies the electrical drive is discharged faster than if the electrical drive is predominantly operated in a velocity range in which it operates comparatively more efficiently.

In addition, it can tend to be unclear at lower velocities of the pram whether the user actually at this moment desires assistance by the electrical drive.

Multiple gradations (for example at least three or at least four) for the force threshold value as a function of the current velocity of the pram are also possible as further embodiments.

In addition (and this concept is also claimed independently as such, optionally as refining), the electrical drive can be activated by a control unit with a soft transition. In this way, hard switching on or off of the assistance by the electrical drive is preferably prevented.

An independent (possibly refining) solution according to the invention is to set a/the controller so that the complete power calculated on the basis of the boundary conditions (target power) is not immediately called up, but rather the transition between the current power (0 or greater than 0) and the target power takes place continuously or in multiple discrete steps in a time interval.

The above object is furthermore preferably achieved by a pram or pram frame, comprising at least one motor, in particular an electric motor, for the assisted driving of the pram or pram frame, a push bar for pushing the pram or pram frame, at least one force sensor device (comprising at least one sensor, in particular as specified or embodied above) for detecting a direction and/or an amount of a force and/or a force component which acts on the push bar, and/or for detecting a variable derived from this force or force component, in particular a torque and/or a change of the force or force component over time, at least one velocity sensor device (comprising at least one sensor, in particular as specified or embodied above) for determining a velocity of the pram or pram frame, and at least one control unit, which is configured in such a way that the motor assistance is adapted in dependence on a comparison of the measured force and/or force component and/or the variable derived therefrom to a force threshold value, wherein the force threshold value is established in dependence on a comparison of the measured velocity to a velocity threshold value.

The length of the time interval can be at most 2 s (two seconds), preferably at most 1 s. Additionally or alternatively, the length of the time interval can be at least 0.01 s, preferably at least 0.05 s.

The soft transition can in particular be designed so that each time a measured value is recorded and/or processed by the control unit (thus respectively after one period duration, wherein the period duration is the reciprocal of a frequency, at which a measured value is recorded or processed), an adaptation of the motor power takes place in that the drive power is adapted by a part of the difference between the current power and the ascertained target power. The soft transition is thus implemented so that not the full difference is equalized, but only a component. The target power is accordingly only reached when the boundary conditions relevant for the ascertainment of the target power do not change over a sufficiently long time period. The control unit can be configured accordingly.

In general, the force sensor device can be designed to detect measured values at a predetermined frequency. Alternatively or additionally, the control unit can be designed to process the measured values at a/the predetermined frequency.

In dynamic driving situations, for example when the pushing force and/or the velocity change progressively, it can be that an ascertained target power is never reached.

Specifically, the pushing force can be detected in discrete steps (for example in at least 20 steps and/or in at most 2000 steps, preferably in 100 to 1000 steps). The motor power can also be able to be regulated or set in discrete steps (for example in at least 5 steps and/or in at most 1000 steps, preferably in 50 to 200 steps).

For the pushing force, a target value can be provided which in particular corresponds to one of the above-mentioned force thresholds (preferably the second value of the force threshold value). Depending on the deviation of the measured pushing force from the target value of the pushing force, the drive power is preferably adapted by a predetermined number of steps in order to reduce the deviation.

The adaptation of the motor power can be linearly dependent on the deviation, however, it is preferably dependent in a super-linear manner (for example including an exponential relationship) on the deviation. In other words, in the case of a high deviation, a higher proportion of the deviation is preferably to be compensated for.

In one exemplary embodiment, the pushing force is detected in 500 steps (stages) and the drive power is regulated in 100 steps (stages). The target value of the pushing force is 100; i.e., when a corresponding pushing force is applied, the motor power is not adapted. However, if a pushing force of 483 is applied, the motor power is thus increased by 32 steps. If a pushing force of 330 is applied, the motor power is thus increased by 16 steps. If a pushing force of 238 is applied, the motor power is thus increased by 8 steps. If a pushing force of 183 is applied, the motor power is thus increased by 4 steps. If a pushing force of 150 is applied, the motor power is thus increased by 2 steps. If a pushing force of 130 is applied, the motor power is thus increased by 1 step.

All steps or intervals between the individual stages (each for the force detection and/or for the drive activation) are preferably equal in size.

The above object is furthermore preferably achieved by a method for controlling a pram or pram frame, in particular as described above and hereinafter, wherein a direction and/or an amount of a force and/or a force component which acts on a push bar, and/or a variable derived from this force or force component, in particular a torque and/or a change of the force or force component over time is detected, wherein a velocity of the pram or pram frame is determined, and wherein the motor assistance is adapted in dependence on a comparison of the measured force and/or force component and/or the variable derived therefrom to a force threshold value, wherein the force threshold value is established in dependence on a comparison of the measured velocity to a velocity threshold value.

The above object is furthermore preferably achieved by a method, in particular the above method for controlling a pram or pram frame, in particular as described above and hereinafter, wherein a direction and/or an amount of a force and/or a force component which acts on a push bar, and/or a variable derived from this force or force component, in particular a torque and/or a change of the force or force component over time is detected, wherein the motor assistance is softly activated, in particular is set so that a complete target power calculated on the basis of boundary conditions is not called up immediately, but rather the transition between the current power, of possibly 0 or greater than 0, and the target power takes place in a time interval via at least one intermediate step or multiple intermediate steps or at least temporarily continuously.

Further, preferred, method steps of the invention are explained above and hereinafter.

Further embodiments result from the dependent claims.

In the following section up to the brief description of the figures, further preferred features of the invention are described. When a feature is not represented as optional in this section, this only applies for the disclosure of this section itself. In particular, this does not (necessarily) mean that the respective feature is in general essential or compelling for the present invention, as is explained in particular in the claims and above. Specifications which relate hereinafter to the pram frame shall also apply to the pram. For example, if it is stated that the pram frame has a motor, it is thus also to be disclosed that the pram has a motor.

In particular a pram frame is proposed, comprising at least one motor, in particular an electric motor, for driving the pram frame, at least one push bar for pushing the pram frame and preferably at least one sensor device, in particular force sensor device. The sensor device, in particular the force sensor device, is preferably designed to detect a direction and/or an amount of a force and/or a force component which acts on the push bar, and/or to detect a variable derived from this force or force component, in particular a change of the force or force component over time.

One aspect is that a force sensor device is provided which detects either the direction or the amount (or both) of a force and/or a force component (or a variable derived from this force or force component). It is thus made possible that a corresponding control can take place based on the output of the sensor device. Output of a sensor device is to be understood in particular as the output of a measured value and/or the output of a mean value of multiple measured values.

The control can then take place internally (by a control unit provided on or in the pram frame) and/or externally by a separate control unit (for example a mobile terminal, in particular a smart phone). However, it is primarily important here that corresponding data relating to the force or variables related to the force can be generated at all. It is insofar advantageous, but not absolutely necessary, that the pram frame (or the corresponding pram) has a control unit itself. Overall, a user-friendly and easily produced pram frame having motor assistance is proposed.

The push bar is preferably integrally formed (possibly having individual parts movable in relation to one another). The push bar can in particular have a horizontal handle. Alternatively, the push bar can also be formed in multiple parts (for example two parts), for example having multiple handles separate from one another.

Using the force sensor device, in particular at least two different force directions (for example forward and reverse and/or upward and downward) can be established and possibly can be determined with respect to their amount or at least four directions (for example forward, reverse, upward, and downward) can be established and possibly can be determined with respect to their amount. At least two different amounts (>0) preferably at least four different amounts, for example a continuum of amounts of the force (or force component or variable derived therefrom) can possibly be detected using the force sensor device. In any case, information is provided by such a force sensor device in a simple manner, which can advantageously be used to control the motor to drive the pram or the pram frame.

The pram frame or the pram preferably has multiple motors, in particular electric motors, for driving the pram frame. Preferably, at least two or precisely two wheels (for example a left and a right wheel or a first lateral wheel and a second lateral wheel) are each assigned a motor. A control unit can preferably be provided for the individual activation of the motors. Alternatively or additionally, a sensor device can be provided for detecting a pushing force and/or movement of the pram frame. The pushing comfort can be improved, in particular during cornering, by multiple (in particular at least or precisely two) motors, without complex measures having to be taken for this purpose (for example in the case of only one motor having a differential gear).

If not indicated otherwise, pushing or a pushing force is to be understood in particular as actions or forces which can be oriented both forward and also in reverse (although the latter can also be referred to as pulling or a traction force).

Insofar as (two) forces are compared to one another and it is stated that the (two) forces are equal or different, this is to be understood in general as an abbreviation for "equal or different with regard to direction and/or amount of the forces"—unless it results from the relationship that the direction is specified (for example, as in the case of a "backward force"); a specification about equal or different forces should then relate to the amounts of the forces.

The at least one (force) sensor device can be arranged on and/or in the push bar, in particular a handle of the push bar, and/or can be arranged in and/or near a push bar fastening region. A push bar fastening region is to be understood in particular as a region at which the push bar is attached to a main body of the pram frame. An arrangement near the push bar fastening region is to be understood in particular as an arrangement at a distance of less than 10 cm, preferably less than 5 cm from the push bar (wherein in the case of a relatively moving push bar, in particular the minimal distance is meant here).

According to one optional aspect of the invention, a method for controlling a pram frame, in particular of the type described above (and hereinafter), or a pram of the type described above (and hereinafter) is proposed, wherein a direction and/or an amount of a force and/or a force component which acts on a push bar, and/or a variable derived from this force or force component, in particular a change of the force or force component over time is detected. Insofar as further functional features of the pram frame or pram are described above and hereinafter, these are to be understood so that a corresponding method step can be carried out. The corresponding device features (for example the force sensor device) are insofar not absolutely decisive with respect to the method, but rather the method steps as such (thus, for example, the detection of a direction and/or an amount of a force). Of course, corresponding device features (for example a force sensor device), as described above and hereinafter, can also be present within the method.

Preferably, at least one control unit is provided, which is operationally connected to the at least one (force) sensor device, in particular in such a way that an output of the at least one sensor is used to control the at least one motor. Simple and reliable detection of the force (or other variable, for example the current movement) can thus take place.

In one embodiment, the at least one sensor device is designed to detect forces and/or force components acting on the push bar and/or the variable derived therefrom at at least two different locations. In particular, this detection can take place at a first (for example left) and a second (for example right) side of the push bar, in particular a first (for example left) and a second (for example right) side of the handle and/or at two different handles, which are in particular each arranged laterally. Insofar as a left or right side is mentioned here and hereinafter, this means in particular a left or right side which results from the viewing direction of the person operating the pram frame or the pram.

In one specific embodiment, the sensor device is designed to determine force components in the movement direction and/or opposite to the movement direction (each horizontally) and/or upward and/or downward (each vertically). Alternatively or additionally, corresponding components of a time derivative (or a change over time) can be determined.

If acting forces (and/or force components and/or force-derived variables) are detected at multiple different locations, the control unit can be designed so that the corresponding drive wheels (or possibly assigned motors) are activated, for example in dependence on dimension and duration of the (in particular horizontally) engaging forces (and/or their changes over time) and/or in dependence on whether the (in particular horizontal) forces (and/or their changes over time) point in the same direction. A drive wheel (or corresponding assigned motor) can be activated in dependence on the force which is applied on one side (and/or the change over time of this force) and/or the force (and/or its change over time) which is applied on the other (opposite) side.

The control unit is preferably designed to control and/or regulate the power of the at least one motor, in particular on the basis of the output of the at least one sensor device, for example in discrete stages and/or continuously.

Furthermore, the control unit can be designed in such a way that at least one motor is started if a first threshold is exceeded of the force and/or force component and/or variable derived therefrom. Starting of the motor is to be understood in particular to mean that the motor provides power to drive the pram frame. In this meaning, switching on the motor (which then runs at idle, for example) is not yet starting. Starting can possibly also mean initial switching on (power supply) of the motor, however.

The control unit can be designed in such a way that at least one motor is stopped or is kept at constant power if a second threshold is exceeded of the force and/or force component (for example a component upward or downward) and/or the variable derived therefrom. Stopping of the motor is in particular to be understood as setting the motor in a state in which it no longer drives the pram. The motor can possibly still continue to run (for example at idle). However, this can also be understood as final switching off (for example an energy interruption for supplying the motor). The second threshold can be greater in absolute value than the first threshold.

Furthermore, the control unit can be designed in such a way that at least one motor is stopped or is kept at a constant power if a threshold $F_d$ of a force acting downward is exceeded and/or if a threshold $F_u$ of a force acting upward is exceeded, wherein $F_d$ and $F_u$ are possibly equal or different (in absolute value), and/or if a threshold $F_{f2}$ of a forward-acting force is exceeded and/or if a threshold $F_{r2}$ of a backward-acting force is exceeded, wherein $F_{f2}$ and $F_{r2}$ are possibly equal or different (in absolute value), wherein $F_{f2}$ and/or $F_{r2}$ is preferably greater, in particular 2 times or 5 times or 20 times as great as $F_u$ and/or Fa. The control unit is preferably designed in such a way that the motor is started (again) if $F_{f2}$, $F_{r2}$, $F_u$, or $F_d$ is not reached (when previously exceeded).

The control function can furthermore be designed in such a way that at least one motor is started if a threshold $F_{f1}$ of a forward-acting force is exceeded and/or if a threshold Fri of a backward-acting force is exceeded, wherein $F_{f1}$ and $F_{r1}$ are equal or different (in absolute value) (and/or possibly if a threshold of a force acting downward is exceeded and/or if a threshold of a force acting upward is exceeded, wherein the threshold of the force acting downward and the threshold of the force acting upward are possibly equal or different), wherein preferably $F_{f1}$ is less (in absolute value) than $F_{f2}$ and/or preferably $F_{r1}$ is less (in absolute value) than $F_{r2}$.

Alternatively or additionally, the control unit can be designed in such a way that if a (horizontal) force on one of the two sides is positive and a (horizontal) force on the other side is negative (which can correspond to a rotation or cornering of the pram) and/or if a change over time of the (horizontal) force on the one side is positive and a change over time of the (horizontal) force on the other side is negative (resulting in rotation or cornering of the pram), the drive wheels (or corresponding assigned motors) are activated in such a way that only one of the drive wheels (motors) provides assistance and/or so that the assistance force does not exceed a predetermined value or that the assistance of both motors is (completely) stopped or at least significantly reduced.

The pram frame preferably has at least one velocity sensor and/or at least one cornering sensor. The velocity sensor is in particular designed in such a way that an amount (and possibly a direction) of a current velocity (of the pram frame in relation to an underlying surface) can be established. The cornering sensor is preferably designed so that a curvature of a rotation or cornering (in the path covered by the pram frame) can be established. The control unit can then possibly be designed so that the assistance of the corresponding motor is stopped when a determined velocity is exceeded and/or a determined cornering curvature is not reached. The reliability and safety during the operation of the pram is thus improved overall.

The control unit can be designed in such a way that a quotient of a pushing force or an (in particular horizontal) pushing force component and an assistance force of the at least one motor is constant, for example, is 1 or greater than 1 or greater than 2 or greater than 3 or less than 1, or is variable, for example, in such a way that the assistance force increases more or less than linearly with the pushing force or the (in particular horizontal) pushing force component. The assistance force can, for example, increase in a polynomial or exponentially or logarithmically with the pushing force.

Furthermore, the control unit can be designed in such a way that a quotient of a change over time of the pushing force or a change over time of an (in particular horizontal) pushing force component and a change over time of the assistance force of the at least one motor is constant, for example, is 1 or greater than 1 or greater than 2 or greater than 3 or less than 1, or is variable, for example, in such a way that the change over time of the assistance force increases more or less than linearly with the change over time of the pushing force or the pushing force component. For example, the change over time of the assistance force can increase in a polynomial or exponentially or logarithmically, etc., with the change over time of the pushing force or the change over time of the pushing force component.

The assistance force (or the change over time of the assistance force) particularly preferably increases more than (only) linearly with the pushing force or pushing force component (or with the change over time of the pushing force or change over time of the pushing force component).

The threshold values and limits described above (and hereinafter) can have a predetermined fixed value or can be changed, for example by a self-learning algorithm.

The control unit is preferably designed in such a way that the drive power of the at least one motor is throttled or stopped when a brake, in particular a deceleration brake (service brake) or parking brake is actuated.

The push bar and/or a section of the push bar (in particular that section of the push bar which at least partially has the sensor device) is preferably freely movable over a movement range, in particular without having to carry out unlocking, preferably against a restoring force.

The movement in this meaning is in particular not to be understood as a movement (solely) for the vertical adjustment of the push bar to adapt the pram frame to the size of the operating person, but rather in particular a (free) movement, which can be used in particular for force measurement and/or can be used as feedback for the user which causes a motor assistance. A "double feedback" can insofar be provided here, on the one hand, by the acting assistance of the motor (which can be recognized as such by the user) and at the same time the movement of the push bar (or push bar section). Thus in particular a force measurement can take place and at the same time a double feedback function can be implemented by the same movement. If one compares this, for example, to a piezoelectric sensor (as a comparatively compact sensor device), in the present case comparatively good feedback is given to the user, which facilitates the operation of the pram for the user (and the user is not only dependent on recognizing the motor assistance as such, which can possibly be comparatively minor).

The (free) movement of the push bar (or push bar section) can be, for example, at least 2 mm or at least 10 mm or at least 20 mm. If one compares such a force sensor device, for example, to a simple piezoelectric sensor, a significant improvement is achieved, since more precise items of information can be provided. A piezoelectric sensor can only establish comparatively small relative movement (well below 1 mm).

In the case of a translational movement, this thus means in particular the movement travel; in the case of a rotational movement or pivot, this thus means the travel of a point of the pivoted section, which carries out the greatest travel of all points. In one embodiment, the push bar or an upper section of the push bar (for example handle) can be pivotable around a fastening region. Alternatively (or additionally), an (upper) section of the push bar can be translationally displaceable in relation to a lower section. Furthermore, the entire push bar can be (translationally) displaceable.

The at least one sensor device can be designed to detect a (time) curve of the force (or force component) and/or the variable derived therefrom. The control can thus be further improved. For example, it can then be made possible to define threshold values for forces (or force components) and/or their changes over time and threshold values for a time, wherein the threshold value for the time can be a duration of an (applied) force (or force component) and/or its change over time, in which the threshold values of the force (or force component) and/or their change over time is (are) exceeded (or not reached).

In principle, the time derivative of the force (or force component) can be understood as a change over time (in the mathematical meaning). A change over time can also be understood, however, as $\Delta F/\Delta t$ (with finite non-infinitesimal $\Delta t$ in the range of, for example, 100 ms to 1 second).

The respective control unit is preferably a regulating unit, in particular a regulating unit for continuous (possibly linear) regulation of the power of the at least one motor, preferably a PID regulating unit (wherein PID stands for proportional integral derivative).

Preferably, at least one brake device, in particular a deceleration brake device and/or parking brake device, is provided. The deceleration brake device is preferably designed to use kinetic energy of the pram frame or pram (with child) for braking (and in particular to convert it into electrical energy). Alternatively or additionally, a/the control unit can be provided and designed in such a way that the parking brake device is automatically activated after a predetermined time, preferably between 3 seconds and 5 minutes (preferably between 10 seconds and 30 seconds), after a (complete) standstill of the pram frame (after prior movement). Alternatively or additionally, a/the control unit can be provided and designed in such a way that the parking brake device is automatically activated after reaching a standstill or a comparatively low velocity after prior travel.

The brake device can in particular be designed as two-stage, preferably in such a way that both a deceleration brake (service brake) and also a parking brake for fixing a parking position (when the pram is completely stopped) are provided. The deceleration brake can be designed in such a way that the pram is braked by friction (at one or more wheels) (wherein kinetic energy is converted into heat). However, at least one motor can preferably be used as a generator to brake the pram (wherein kinetic energy is converted into electric energy, which can in turn be used to charge one or more batteries). For the deceleration brake, an arbitrary actuating device can be provided, for example, a lever actuatable by hand or finger (on the push bar or handle) or another device (for example a twist grip or a foot pedal or the like). It is also optionally possible that a graphic user interface (for example, a display, in particular a touchscreen) is connected to the pram and/or has a receiver to be connectable to an external device (for example a smart phone having a corresponding app). The actuating device (or the receiver) can be connected to the deceleration brake (by suitable means) to actuate the deceleration brake, i.e., to apply the brake force desired by the user (which can be zero or greater than zero, in particular can assume more than 2 or more than 5 different values greater than zero). The deceleration brake can act as long as the actuating device is actuated or until the pram is completely stopped and then possibly the parking brake acts.

The parking brake can be designed as a lock which prevents one or more wheels from rotating. For example, the parking brake can comprise a pin which interacts with spokes or catch devices (for example grooves), which are provided in a lateral surface of the wheel.

The parking brake can be possibly (automatically) activated immediately after or a predetermined time after the pram frame or the pram has been stopped, in particular by the deceleration brake. Preferably, the at least one parking brake device is (only) activatable electrically or electronically and is (only) manually releasable.

The parking brake device can be pre-tensioned in a released state and can be not or (only) slightly pre-tensioned in an activated state. The safety upon the operation is improved by these measures.

The actuation of the parking brake can be carried out in various ways, for example, via a switch, e.g., a sliding switch or pressure switch or a foot pedal or the like.

In particular if the parking brake is pre-tensioned in the activated state, releasing the parking brake is (only) manually possible, whereas possibly an activation of the brake is (only) electronically or electrically enabled.

A/the sensor device, in particular the force sensor device, can be provided and the/a control unit can be designed in such a way that at least one brake device, in particular the deceleration brake device and/or the parking brake device, is activated when a person operating the pram releases a contact, for example, via the hand and the handle. The deceleration brake is preferably activated with elevated (maximum) force and/or the parking brake is activated (emergency braking) when it is established that the person operating the pram no (longer) has contact with the pram and the pram nonetheless moves.

In one embodiment, the control unit is designed in such a way that the brake device is activated when the force sensor device detects a force which is directed (at least partially) against the current movement direction of the pram frame. Alternatively, in such a case a motor assistance can take place as described above. The motor is preferably used as a power generator in case of braking.

At least one display or signal device can be provided which notifies the user of the pram frame that a motor assistance is provided or can be provided. A first display or signal device can possibly indicate that currently a motor assistance is provided and a second display or signal device can indicate that a motor assistance can be provided, in the meaning that, in dependence on further parameters (for example a maximum velocity or the like), either a motor assistance is provided or (if the parameters are corresponding) is not provided.

Overall, the pram or the pram frame of the present invention can enable comfortable assistance when pushing (or pulling) the pram. In particular, it is possible to set values $F_{f1}$ and/or $F_{r1}$ which (essentially) define those forces which have to be used (at most) by the user (independently of the situation). When one starts with a pram which is stationary, the user will begin to push (or to pull). The horizontal component of the pushing force or traction force will thereupon become greater than zero. At the time at which $F_{f1}$ is reached, the motor can begin to assist the user (with minimal power). For example, when the horizontal component of the pushing or traction force increases further (i.e., $\Delta F_{inh}/\Delta t > 0$), the assistance force will also increase (i.e., $\Delta F_s/\Delta t > 0$). The horizontal component of the force can thus be kept (essentially) constant at $F_{f1}$ (at least if one does not take into consideration an overshoot). Of course, if a condition for stopping the motor assistance is present, a greater force can possibly be necessary.

$F_u$ can be between 0 and 25 N, preferably between 5 N and 15 N. $F_d$ can be between 10 N and 50 N, preferably between 20 N and 40 N. $F_{f1}$ can be between 0 and 25 N, preferably between 5 N and 15 N. $F_{r1}$ can be between 0 and 25 N, preferably between 5 N and 15 N. $F_{f2}$ and/or $F_{r2}$ can be between 25 N and 500 N, preferably between 50 N and 200 N.

$F_{f1}$, $F_{r1}$, $F_{f2}$, and/or $F_{r2}$ can possibly be specified by the user, for example via an interface, for example a graphic user interface and/or a smart phone (or a smart phone app). Minimal and maximal values can possibly be specified (by the producer) to avoid safety problems and/or to extend the usage duration of a battery.

The invention is described hereinafter on the basis of exemplary embodiments, which are explained in more detail on the basis of the figures. In the figures.

Figure 1:
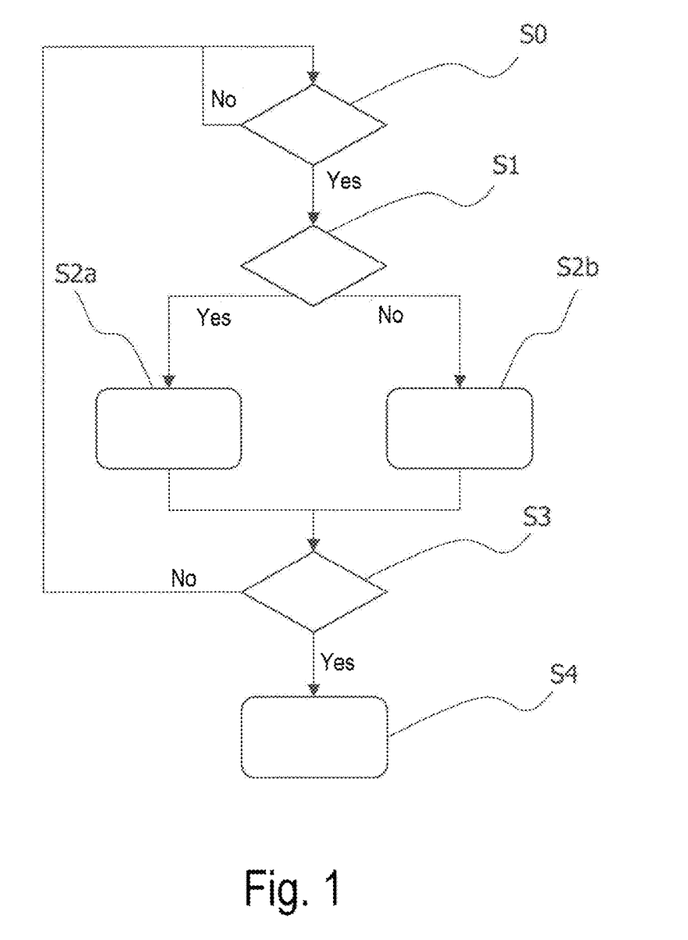
FIG. 1 shows a flow chart of an exemplary embodiment of the present invention.

FIG. 1 shows a flow chart of an exemplary embodiment of the present invention. In (optional) step S0, it is first queried whether the wheels (rear wheels), which are additionally driven by the electrical drive (the assistance), move (rotate) at all. If this is the case, it is queried in step S1 at which velocity v the pram moves.

The velocity can be determined, for example, by a separate velocity sensor, or on the basis of the current motor speed in conjunction with the physical dimensions of the wheel (rear wheel) and possible intermediate gear ratios.

In step S1, it is decided on the basis of the determined current velocity of the pram whether the force threshold value is set to its first value (for example 25 N or 30 N) (step S2a), or whether the force threshold value is set to its second value (for example 17 N) (step S2b). If the velocity in step S1 is less than the velocity threshold (for example of greater than 0.000 m/s to 0.556 m/s), the force threshold value is set to its first value, otherwise its second value is used.

In step S3, the measured current force which acts externally on the push bar is compared to the force threshold value from step S2a or S2b. If the corresponding force threshold value is not exceeded, the sequence returns to step S0. If, in step S3, the force threshold value from step S2a or S2b is exceeded, in step S4 the electrical drive is thus activated (and assistance by the electrical drive is initiated or adapted).

Figure 2:
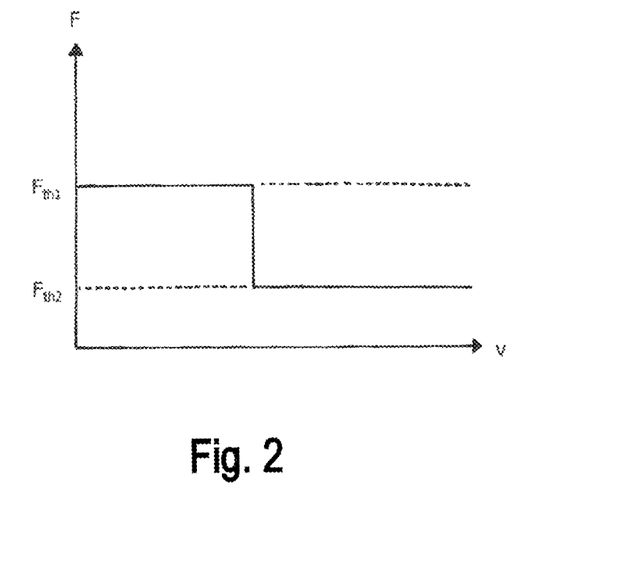
FIG. 2 shows a diagram: force over the measured velocity v.

In FIG. 2, the force is plotted over the measured velocity v. If the measured velocity is below the velocity threshold value, the force threshold value is set to its first value $F_{th1}$. If the measured velocity v is above the velocity threshold value, the force threshold value is set to its second value $F_{th2}$.

Figure 3:
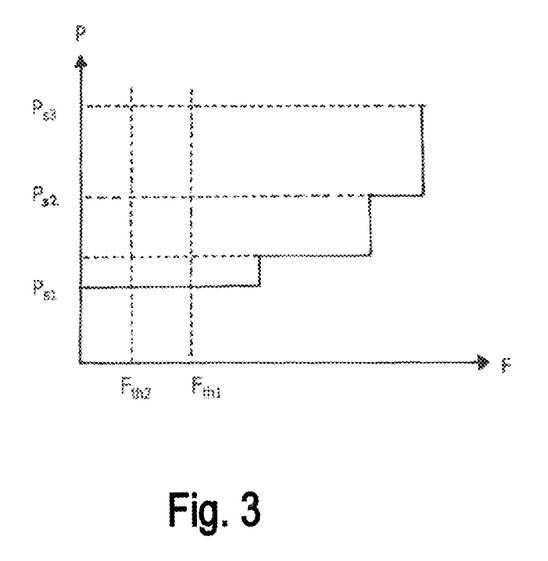
FIG. 3 shows a diagram: adaptation P of the assistance of the electrical drive via the force F acting externally on the push bar.

In FIG. 3, an exemplary embodiment of a soft transition is shown. The adaptation P of the assistance of the electrical drive via the force F acting externally on the push bar is shown. Furthermore, the high value $F_{th1}$ and the low value $F_{th2}$, to which the force threshold value can be set, are shown. Three adaptation stages $P_{s1}$, $P_{s2}$, and $P_{s3}$ are shown.

Figure 4:
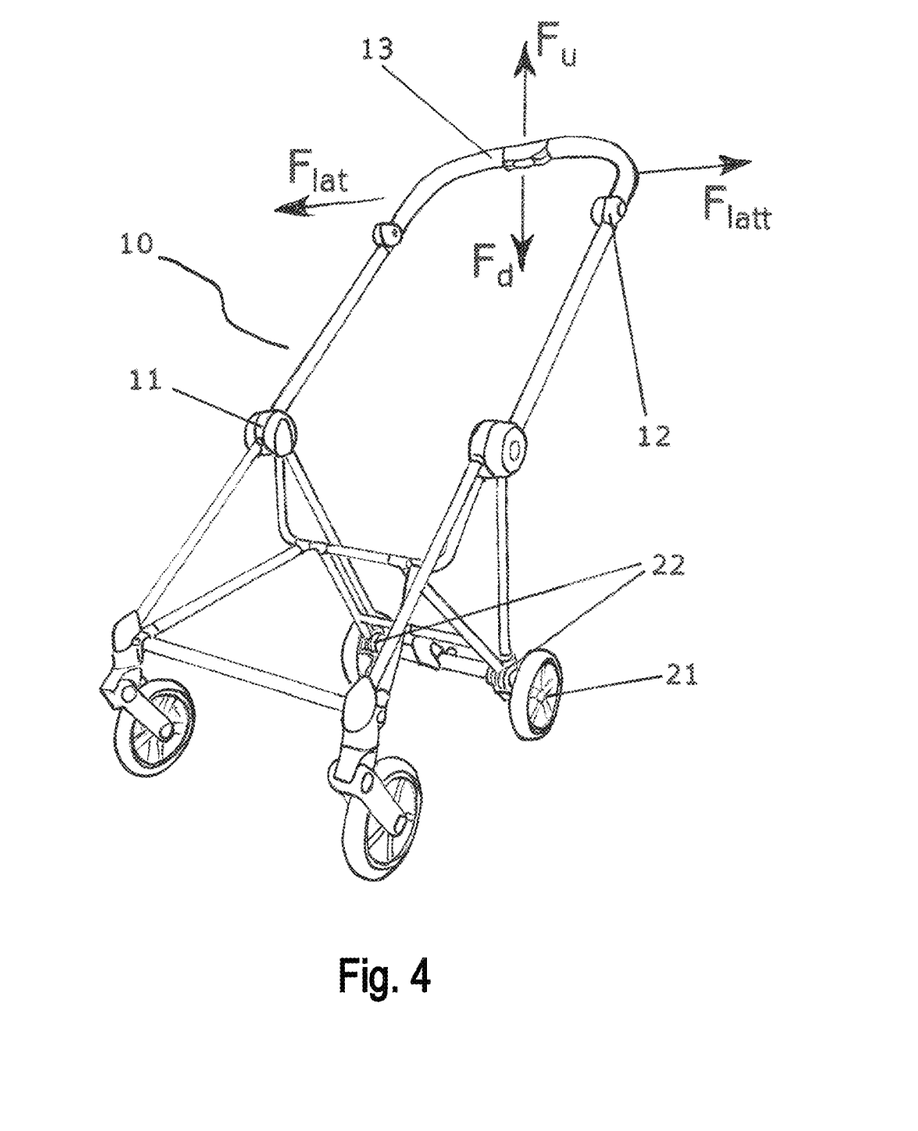
FIG. 4 shows a schematic diagonal view of a pram frame according to the invention.

FIG. 4 shows a pram frame according to the invention in a schematic diagonal view. The arrows $F_d$ show a downward-directed force engaging on a handle 13 (horizontal section of a push bar 10). The arrow $F_u$ shows an upward-directed force engaging on the handle 13. The arrows $F_{lat}$ show laterally directed forces. The handle 13 is pivotably mounted in relation to a lower section of the push bar 10.

Specifically, the handle 13 can be pivoted (and locked) into various positions to carry out a vertical adjustment of the handle 13.

A pivotable mounting 12 (having corresponding joints) is provided between the pivotable handle 13 and the lower section of the push bar 10.

The (entire) push bar 10 is in turn preferably pivotably mounted on a pivotable mounting 11 on a main body of the pram frame (in particular to be able to collapse the pram frame).

Figure 5:
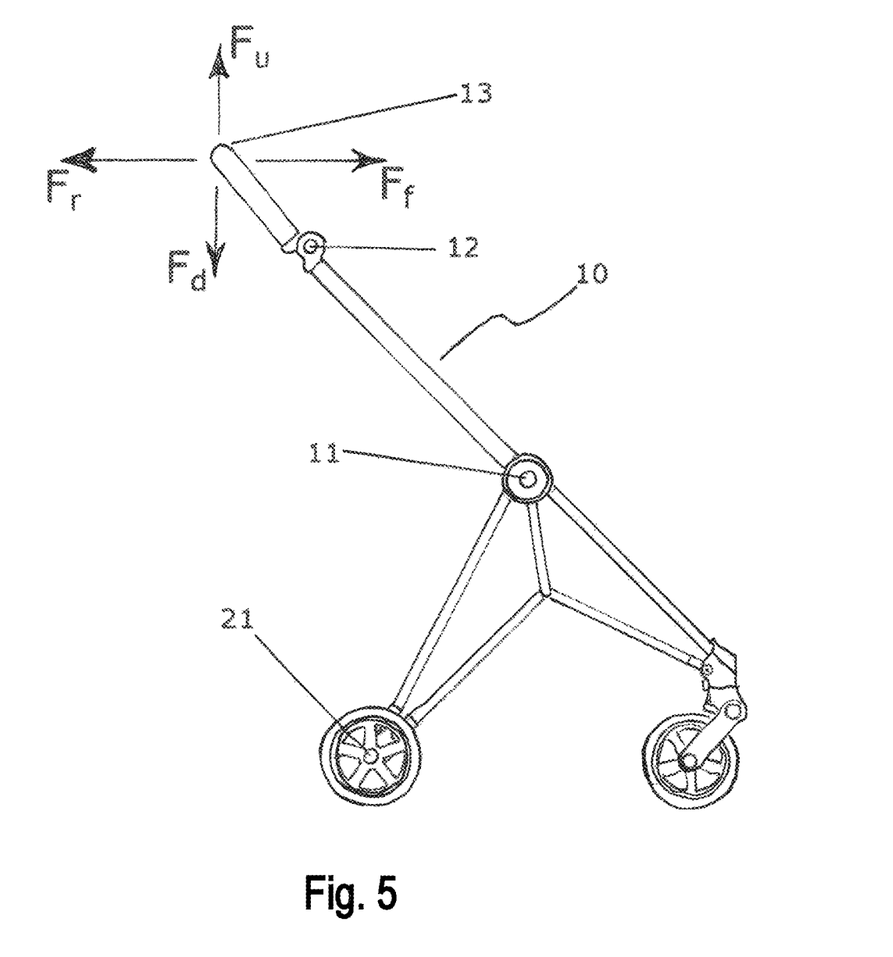
FIG. 5 shows a side view of the pram frame according to FIG. 4.

A sensor device/sensor devices is/are preferably provided in the pivotable mounting 11 and/or in the pivotable mounting 12, in order to detect a force of a user (in particular $F_u$ and $F_d$) acting on the handle 13. Furthermore (see FIG. 5), a forward-directed force $F_f$ and a backward-directed force $F_r$ can preferably be detected using such a sensor device or such sensor devices. Motors (not recognizable in detail) can preferably be placed in wheel hubs 21. Alternatively, motors can be placed on an axle 22 (in particular on sections of the axle which are adjacent to the wheel hub 21).

It is to be noted here that all above-described parts are claimed as essential to the invention considered as such and in any combination, in particular in the details illustrated in the drawings. Modifications thereof are routine to a person skilled in the art.

LIST OF REFERENCE SIGNS

F force which acts on the push bar of the pram
$F_{th1}$ first value of the force threshold value
$F_{th2}$ second value of the force threshold value
P adaptation of the assistance, for example in percent with respect to the maximum possible assistance
Ps1 adaptation stage
Ps2 adaptation stage
Ps3 adaptation stage
v currently detected velocity of the pram;
S0 querying whether the rear wheels of the pram rotate;
S1 querying whether the current velocity is in a low range;
S2a setting the force threshold value to a high value;
S2b setting the force threshold value to a low value;
S3 querying whether the force threshold value is exceeded; and
S4 activating the electrical drive.
10 push bar
11 pivotable mounting
12 pivotable mounting
13 handle (horizontal section of the push bar)
21 wheel hub
22 axle

The invention claimed is:

1. A pram, comprising:
at least one motor configured for assisted driving of a frame of the pram,
a push bar configured for pushing the frame,
at least one force sensor configured to measure a force acting on the push bar relative to the frame, and configured to provide an output corresponding to at least one of a torque, a change of the force, or a force component over time, and
at least one velocity sensor for measuring a velocity of the frame, and at least one control unit configured such that a motor assistance is based on a comparison of the measured force and a force threshold value, wherein the force threshold value is based on a comparison of the measured velocity to a velocity threshold value; and
at least one control unit configured to set a force threshold value to a first positive value if a current velocity is less than or equal to the velocity threshold value and to set it to a second positive value if the current velocity is greater than or equal to the velocity threshold value, wherein the first positive value is not equal to the second positive value;

wherein the velocity threshold value is less than 4 km/h, or the first positive value of the force threshold value is higher than the second positive value of the force threshold value or the first positive value of the force threshold value is greater than or equal to 20 N, or the second positive value of the force threshold value is between 8 N and 25 N, or a length of a time interval is at most 2 s (two seconds).

2. The pram according to claim 1,
wherein the at least one control unit is configured such that the motor assistance is transitioned between a present power and a target power in a time interval via at least one intermediate step or at least temporarily continuously.

3. The pram according to claim 2,
wherein the at least one control unit is configured such that, when a currently measured force exceeds or reaches the force threshold value, the motor assistance is permitted, and when the currently measured force does not exceed or does not reach the force threshold value, the motor assistance is not permitted.

4. The pram according to claim 2,
wherein the at least one control unit is configured such that a transition from a first motor assistance to a second motor assistance is determined by a part of a difference between a current power and an ascertained target power.

5. The pram according to claim 1,
wherein the at least one force sensor comprises at least one torque sensor or at least two sensors.

6. The pram according to claim 1,
wherein the at least one control unit is configured such that motor assistance is permitted if at least one wheel rotates.

7. The pram according to claim 1,
wherein the at least one control unit is configured such that motor assistance is based on the measured force and based on the measured velocity.

8. The pram according to claim 1,
wherein the at least one control unit is configured such that motor assistance is activated such that an average force applied is regulated to a force value determined based on a first force threshold value or a second force threshold value.

9. A method for controlling a pram according to claim 1.

* * * * *